United States Patent
Furugen et al.

(10) Patent No.: US 6,840,283 B2
(45) Date of Patent: Jan. 11, 2005

(54) HIGH-PRESSURE FUEL INJECTION PIPE HAVING CONNECTING HEAD PORTION

(75) Inventors: Munekatsu Furugen, Numazu (JP); Shigeyuki Ishida, Mishima (JP); Nobuo Kato, Susono (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 10/439,830

(22) Filed: May 16, 2003

(65) Prior Publication Data

US 2003/0230349 A1 Dec. 18, 2003

(30) Foreign Application Priority Data

May 20, 2002 (JP) ........................................ 2002-144887

(51) Int. Cl.⁷ ................................................. F16L 9/00
(52) U.S. Cl. .................... 138/109; 123/468; 72/370.11; 285/386
(58) Field of Search .................... 138/109; 285/386; 123/468; 72/370.11

(56) References Cited

U.S. PATENT DOCUMENTS

| | | | |
|---|---|---|---|
| 4,134,430 A | * | 1/1979 | Mukasa et al. .............. 138/109 |
| 4,152,817 A | * | 5/1979 | Cotten ....................... 29/890.14 |
| 4,784,311 A | * | 11/1988 | Sugao .......................... 228/131 |
| 5,109,888 A | * | 5/1992 | Usui ............................ 138/109 |
| 5,143,410 A | | 9/1992 | Takikawa .................... 285/197 |
| 5,402,829 A | | 4/1995 | Takikawa et al. |
| 5,667,255 A | | 9/1997 | Kato |
| 5,903,964 A | | 5/1999 | Uematsu et al. |
| 5,957,507 A | | 9/1999 | Asada |
| 5,979,945 A | | 11/1999 | Hitachi et al. |
| 5,992,904 A | | 11/1999 | Hitachi et al. |
| 6,045,162 A | | 4/2000 | Haibara |
| 6,050,611 A | | 4/2000 | Asada |
| 6,186,121 B1 | | 2/2001 | Uematsu et al. |
| 6,415,768 B1 | | 7/2002 | Usui |
| 6,431,608 B1 | | 8/2002 | Kato |
| 6,536,806 B1 | | 3/2003 | Uematsu et al. |
| 2001/0003398 A1 | * | 6/2001 | Usui .......................... 285/405 |

FOREIGN PATENT DOCUMENTS

JP           8-75075           3/1996

* cited by examiner

Primary Examiner—James Hook
(74) Attorney, Agent, or Firm—Gerald E. Hespos; Anthony J. Casella

(57) ABSTRACT

A high-pressure fuel injection pipe having connecting head portion is provided which is capable of eliminating a fear of the occurrence of cavitation erosion of the inner surface of the connecting head portion and a fatigue failure of the same head portion by having a contour of a cross section of an annular pocket occurring in an inner part of the connecting head portion during a head portion processing operation extend shallowly and gently. This fuel injection pipe has at a connecting end portion of a thick-walled steel pipe having a relatively small diameter, including a seat surface, an annular flange formed so that the flange is axially spaced from the seat surface, and a conical surface connected to the seat surface, extending therefrom to the annular flange and tapering off to a free end of the connecting head portion, wherein the conical surface is provided at a part thereof with an annular, shallow, cross-sectionally curved recess.

8 Claims, 3 Drawing Sheets

US 6,840,283 B2

HIGH-PRESSURE FUEL INJECTION PIPE HAVING CONNECTING HEAD PORTION

BACKGROUND OF THE INVENTION

1. Field of the Invention

This invention relates to a high-pressure fuel injection pipe having a connecting head portion at a free end thereof made of a thick-walled pipe having a relatively small diameter of about 4 m/m to about 20 m/m and a wall thickness of about 1 m/m to 8 m/m used widely in a suitably arranged state as a fuel supply path and the like for, for example, a diesel internal combustion engines.

2. Description of the Prior Art

The known high-pressure fuel injection pipes of this kind include high-pressure fuel injection pipe having a connecting head portion (JP-A-8-75075) having as shown as an example in FIG. 4 at a connecting end portion of a thick-walled steel pipe 11 having a relatively small diameter a connecting head portion 12 formed with a seat surface 13, an annular flange 15 formed so that the flange 15 is axially spaced from the seat surface 13, and a conical surface 14 connected to the seat surface 13, extending therefrom to the annular flange 15 and tapering off to a free end of the connecting head portion 12 This kind of connecting head portion 12 is molded by a buckling process carried out by axially pressing the same connecting head portion 12 from the outside by a punch member. Concerning this molding operation, the connecting head portion 12 is formed with a deep, sharp and large annular pocket 16 occurring in an inner circumferential surface thereof due to an outward expansion of a circumferential wall thereof accompanied by the buckling process based on the punch-pressing opera,ion. This high-pressure fuel injection pipe in such a condition is put to practical use at present.

However, such a prior art high-pressure fuel injection pipe having a connecting head portion has a problem of causing during a practical use of the injection pipe the cavitation erosion of a part thereof around a deep, sharp and large annular pocket, which is formed in an inner surface of a connecting head portion, to occur during a practical use thereof due to a high-pressure fluid, and a problem of having the possibility that a fatigue failure of the fuel injection pipe starts at the deepest part of the pocket portion.

The present invention has been made in view of these problems encountered in the above-mentioned prior art fuel injection pipe. One of the objects of the present invention is to provide a high-pressure fuel injection pipe having connecting head portion at free end thereof capable of having a contour of a cross section of an annular pocket occurring in an inner part of the connecting head portion during a head portion processing operation extend shallowly and gently, and therefore capable of eliminating a fear of the occurrence of cavitation erosion of an inner part of the connecting head portion and a tear of the occurrence of a fatigue failure of the same head portion

SUMMARY OF THE INVENTION

In order to achieve this object, the invention provides a high-pressure fuel injection pipe having connecting head portion the gist of which resides in that the fuel injecting pipe has at a connecting end portion of a thick-walled steel pipe having a relatively small diameter a connecting head portion formed by a seat surface, an annular flange formed so that the flange is axially spaced from the seat surface, and a conical surface connected to the seat surface, extending therefrom to the annular flange and tapering off to a free end of the connecting head portion, wherein the conical surface is provided at a part thereof with an annular, shallow, cross-sectionally curved recess, by which the annular recess in an inner surface of the head portion which occurs during the molding of the connecting head portion is formed so that the inner recess has a shallow, gently curved cross section. The annular cross-sectionally curved recess in a part of the conical surface is provided in the region of the connecting head portion which is closer to the seat surface than to the annular flange. In a cross-section of the connecting head portion, let an A1 point equal an annular flange-side edge of the cross-sectionally curved recess, an A2 point the edge of the same curved recess which is on the opposite side of the flange, $\underline{d}$ an outer diameter of the injection pipe, and DA an outer diameter of the connecting head portion which corresponds to the A2 point. It is characteristics of the invention to satisfy the condition of DA/d=0.95 to 1.3, preferably 1.0 to 1.25, and the condition of a depth of the curved recess, which extends between the A1 point and A2 point, in the radial direction of the injection pipe, i.e. the depth of the curved recess in the mentioned direction $\geq$DA. Let L equal the axial length of the part of the connecting head portion which is between a free edge of a spherical seat surface and an axial part of the connecting head portion which corresponds to the A1 point, and W the axial length (axial width of the curved recess) of the part of the connecting head portion which is between the A1 point and A2 point. It is also characteristics of the invention to satisfy the condition of W/L=0.3 to 0.75, preferably 0.35 to 0.7.

Namely, according to the present invention, an annular, shallow, cross-sectionally curved recess is provided in a part of a conical surface of the connecting head portion. As a result, a part of the conical surface of the connecting head portion is held by a pressing operation of a projecting curved surface, which is engageable with the same curved recess, provided in advance on a molding punch. This enables the annular recess (pocket), which occurs in an inner circumferential surface of the connecting head portion during a connecting head portion buckling molding operation, to become shallow and gently curvilinear. Therefore, a fear of causing the occurrence of the cavitation erosion of the connecting head portion due to a fluid pressure therein can be eliminated, and the possibility that a fatigue failure of the connecting head portion due to stress concentration starts at this inner, annular recess can be reduced.

The reasons why a ratio of the axial length (axial width of the annular curved recess) W of the outer part of the connecting head portion which is between the A1 point and A2 point to the length L of the outer part of the connecting head portion which is between a free edge of the seat surface and A1 point is limited to 0.3 to 0.75, preferably 0.35 to 0.7, are as follows. When this ratio is lower than 0.3, the A2 point conversely becomes too close to the A1 point, and the axial length of the annular cross-sectionally curved recess (extending between the A1 point and A2 point) decreases, so that an effect of reducing the depth of the inner surface of the pocket becomes small. On the other hand, when this ratio exceeds 0.75, the point A2 becomes too close to the free end of the connecting head portion, and it becomes difficult to secure a contact seal surface with respect to a metal surface of a punch to be engaged therewith. Moreover, the rigidity of the outer part of the connecting head portion which is in the vicinity of the free edge thereof decreases, and this part is rendered easily deformable.

The reasons why the DA/d is limited to 0.93 to 1.3, preferably 1.0 to 1.25, are as follows. When this ratio is smaller than 0.95, the A2 point becomes too close to the free end of the connecting head portion, and it becomes difficult to secure a contact seal surface with respect to a metal surface of a punch to be engaged therewith. On the other hand, when the ratio exceeds 1.3, the A2 point conversely becomes too close to the A1 point, and the axial length of the annular curved recess (extending between the A1 point and A2 point) decreases, and an effect of reducing the depth of the recess in the inner surface of the pocket becomes small.

The reason why the radial depth of the part of the cross-sectionally curved recess which is on the side of the free end of the connecting head portion is set not smaller than DA is to eliminate an undercut occurring during the molding of the connecting head portion by punching. Namely, when the part of the curved recess which is on the side of the free end of the connecting head portion is provided at the part thereof in a position on the connecting head portion the diameter of which is smaller than DA (position of A2 point), an undercut is formed, so that the molding of the connecting head portion by a punch becomes unable to be done.

BRIEF DESCRIPTION OF THE DRAWINGS

A preferred embodiment of the present invention will now be described with reference to the accompanying drawings, wherein.

DETAILED DESCRIPTION OF THE PREFERRED EMBODIMENT

Figure 1:
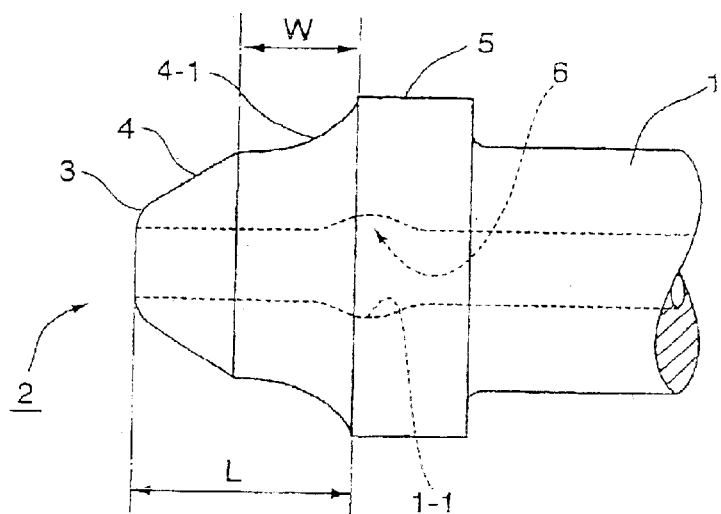
FIG. 1 is a side view showing an example of the connecting head portion of the high-pressure fuel injection pipe according to the present invention.

According to the present invention, a reference numeral 1 denotes a thick-walled steel pipe having relatively small diameter, 2 a connecting head portion, 3 a seat surface, 4 a conical surface, 5 an annular flange, 6 a pocket, 7 a chuck, and 8 a punch member.

The thick-walled steel pipe 1 is a thick-walled pipe of a relatively small diameter of about 4 m//m, to about 20 m/m and a wall thickness of about 1 m/m to about 8 m/m made of a carbon steel pipe used as a high-pressure pipe and cut off to a predetermined size beforehand.

Figure 2:
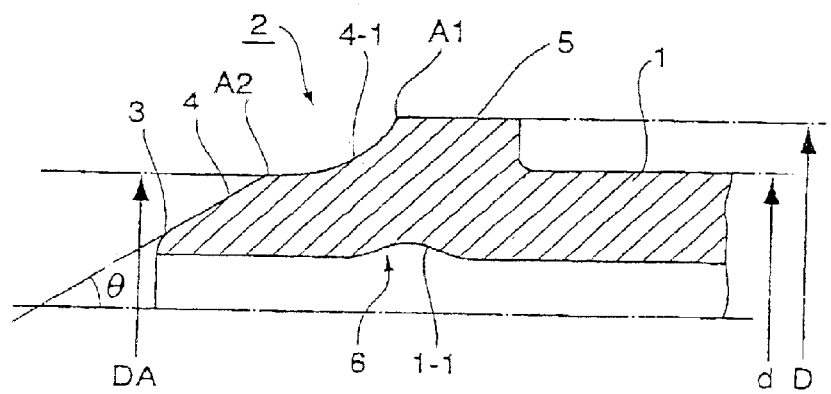
FIG. 2 is a longitudinal sectional view of a half of the same connecting head portion.

A high-pressure fuel injection pipe shown in FIG. 1 and FIG. 2 has at a connecting end part of a thick-walled steal pipe 1 a connecting head portion 2 which includes a seat surface 3 formed on a connecting end portion of the thick-walled steel pipe 1 and engageable at an outer circumferential surface thereof with a seat portion of a punch, an annular flange 5 provided so that the flange is spaced axially from the seat surface 3, a conical surface 4 connected to the seat surface, extending therefrom to the annular flange 5 and tapering off to a free end of the connecting end portion, and a shallow, annular, cross-sectionally curved recess 4-1 formed in a part of the conical surface 4, and which has a shallow, gently curved, annular recess 1-1 in an inner surface of the thick-walled steel pipe 1. The seat surface 3 may be either spherical or cross-sectionally arcuate.

In the connecting head portion 2, the annular, cross-sectionally curved recess 4-1 provided in a part of the conical surface 4 is formed in the part of the connecting head portion which is on the side or the seat surface 3 rather than on the side of the annular flange 5. In a cross-section of the connecting head portion, let an A1 point equal an annular flange-side edge of the curved recess 4-1, an A2 point the edge of the same curved recess which is on the opposite side of the flange, $\underline{d}$ an outer diameter of the pipe, DA an outer diameter of the part of the connecting head portion which corresponds to the A2 point, W the axial length (width of the curved recess) of the part of the connecting head portion which extends between the A2 point and A1 point, and L the axial length of the connecting head portion which is between the free edge of the spherical seat surface and the A1 point. The axial length (width of the curved recess) of the part of the connecting head portion which is between the A-1 point and the A2 point is set to W/L=0.3 to 0.75, a ratio DA/d= 0.95 to 1.3, and a diameter of the position on the outer curved recess which is on the side of the free end or the head portion in which the outer curved recess starts being formed to $\geq$DA. An angle $\theta$ of the seat surface is about 25 to about 30 degrees.

Figure 3:
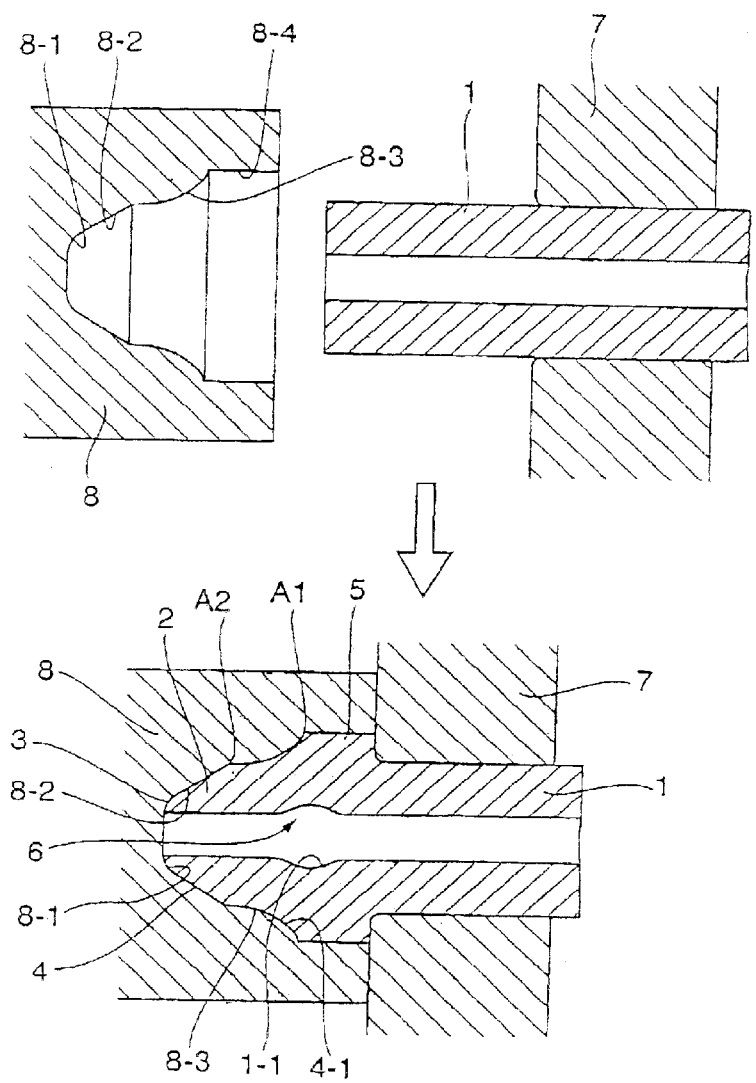
FIG. 3 is an explanatory longitudinal sectional view showing a processing step of a method of molding the same connecting head portion.
Figure 4:
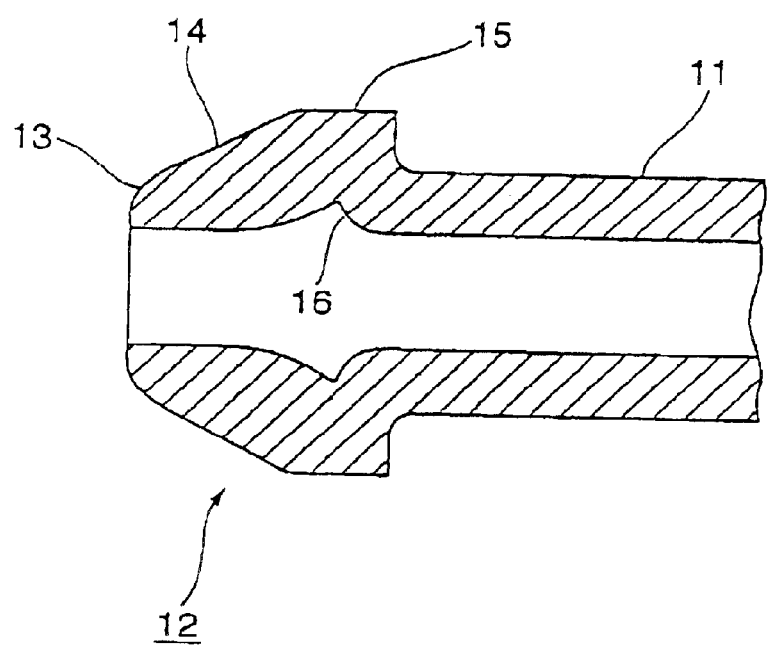
FIG. 4 is a sectional view showing an example of a connecting head portion of a prior art high-pressure fuel injection pipe an improvement on which has been made by the present invention.

A method of molding the head portion of the high-pressure fuel injection pipe shown in FIG. 1 and FIG. 2 will now be explained on the basis of FIG. 3. According to the present invention, a punch on which a spherical surface 8-1, a conical surface 8-2, a projecting curved portion 8-3 and a flat portion 8-4 which correspond to the seat surface 3, conical surface 4, outer curved recess 4-1 and an outer circumferential surface of the annular flange 5 respectively of the connecting head portion 2 are formed is used as the punch member 8.

When a free end portion of such a thick-walled steel pipe 1 retained by the chuck 7 is pressed axially by the punch member 8 during a connecting head portion molding operation, a head portion-forming margin of the thick-walled steel pipe 1 is plastically fluidized, and a connecting head portion 2 having a connecting end portion is obtained which is provided on an outer circumferential surface of a free end part of the thick-walled steel pipe 1 with a seat surface 3 corresponding to a seat portion of the punch member, an annular flange 5 provided so that the flange 5 is spaced axially from the seat surface 3, a conical surface 4 connected to the seat surface, extending therefrom to the annular flange and tapering off to a free end of the connecting head portion 2, and a shallow annular curved recess 4-1 formed in a part of the conical surface 4, and which is provided in an inner surface of the thick-walled steel pipe 1 with a shallow, gently curved annular recess 1-1.

As high-pressure fuel injection pipe having connecting head portion at free end thereof according to the present invention is provided with a shallow, annular, cross-sectionally curved recess in a part of a conical surface of the connecting head portion. Owing to the provision of this recess, a part of the conical surface of the connecting head portion is restrained by an action of a projecting curved surface provided in a molding punch and engageable with this curved recess. This enables an inner, annular recess (pocket), which occurs due to a buckling connecting head portion molding operation, in an inner surface of the connecting head portion to have a cross-section of a shallow, gently curvilinear contour. Therefore, a fear that the cavitation erosion of an inner circumferential surface of the connecting head portion due to a fluid pressure therein is eliminated, and an excellent effect of greatly reducing the possibility that a cavitation eroded part becomes a starting point of a fatigue failure of the connecting head portion is displayed.

What is claimed is:

1. A high-pressure fuel injection pipe having at free end of a connecting end portion of a thick-walled steel pipe having a relatively small diameter a seat surface, an annular flange formed so that the flange is axially spaced from the seat surface, and a conical surface connected to the seat surface, extending therefrom to the annular flange and tapering off to a free end of the connecting head portion, the improvement which comprises a shallow, annular, cross-sectionally curved recess formed in a part of the conical surface, the cross-sectionally curved recess causing an annular recess occurring in an inner surface of the connecting head portion during a connecting head portion molding operation to have a cross section of a shallow, gently curvilinear contour.

2. The improvement according to claim 1, wherein the annular, cross-sectionally curved recess has an A1 point which is closer to the seat surface than to the annular flange; and an A2 point between the A1 point and the flange, the steel pipe having an outer diameter (d), and the connecting head portion having an outer diameter (DA) substantially adjacent the A2 point so that the following conditions are then satisfied $$DA/d = 0.95 \text{ to } 1.3$$

and so that the annular cross-sectionally curved recess at all locations between the A1 point and the A2 point has a diameter $\geq$ DA.

3. The improvement according to claim 1, wherein the annular, cross-sectionally curved recess in a part of the conical surface is provided in the region of the connecting head portion which is closer to the seat surface than to the annular flange; in a cross-section of the connecting head portion, let an A1 point equal an annular flange-side edge of the cross-sectionally curved recess, an A2 point the edge of the same curved recess which is on the opposite side of the flange, L the axial length of the part of the connecting head portion which is between a free edge of a spherical seat surface and an axial part of the connecting head portion which corresponds to the A1 point, and W the axial length of the part of the connecting head portion which is between the A1 point and A2 point; and the conditions of W/L=0.3 to 0.7 are then satisfied.

4. A high-pressure fuel injection pipe formed from steel and having a connecting end, an inner surface extending along an axis of said pipe for defining a passage through said pipe and an outer surface spaced outwardly from said inner surface, said outer surface defining a relatively small diameter for said pipe and said inner and outer surfaces defining a thick wall for said pipe, a connecting head being formed adjacent said connecting end of said pipe, said connecting head comprising:

a seat surface substantially at said connecting end, a generally conical surface extending outwardly from said seat surface and a flange at an end of the generally conical surface remote from the seat surface, the generally conical surface having an annular cross-sectionally curved recess configured for generating an annular recess in the inner surface of the connecting head that is of shallow gently curvilinear contour.

5. The high-pressure fuel injection pipe of claim 4, wherein the generally conical surface has a front section adjacent the seat surface and a rear section adjacent the flange, the annular cross-sectionally curved recess being on the rear section, the front and rear sections meeting at a circular intersection, all locations on the rear section of the generally conical surface defining an outside diameter that is no less than the outside diameter at the circular intersection.

6. The high-pressure fuel injection pipe of claim 5, wherein the circular intersection of the front and rear sections of the generally conical surface defines an outside diameter DA and where portions of the pipe spaced from the connecting head define an outside diameter d, the connecting head being formed to satisfy the relationship $0.95 \leq DA/d \leq 1.3$.

7. The high-pressure fuel injection pipe of claim 6, wherein the annular cross sectionally curved recess is outwardly concave on all longitudinal cross sections taken through the pipe.

8. The high-pressure fuel injection pipe of claim 4, wherein the annular cross-sectionally curved recess has an axial length W, and the connecting head has an axial length L selected to achieve the relationship $0.3 \leq W/L \leq 0.7$.

* * * * *